United States Patent [19]
Harke et al.

[11] 3,904,496
[45] Sept. 9, 1975

[54] ELECTROLYTIC PRODUCTION OF CHLORINE DIOXIDE, CHLORINE, ALKALI METAL HYDROXIDE AND HYDROGEN

[75] Inventors: Cyril J. Harke, Burnaby; Jeffrey D. Eng, North Vancouver, both of Canada

[73] Assignee: Hooker Chemicals & Plastics Corporation, Niagara Falls, N.Y.

[22] Filed: Jan. 2, 1974

[21] Appl. No.: 429,997

[52] U.S. Cl. ............... 204/98; 204/101; 204/128; 204/296; 204/290 F; 204/129
[51] Int. Cl. .................. C01d 1/06; C01b 7/06
[58] Field of Search ......... 204/98, 128, 101, 296, 204/290 F, 103, 295, 129

[56] References Cited
UNITED STATES PATENTS
| | | | |
|---|---|---|---|
| 3,438,879 | 4/1969 | Kircher et al. | 204/98 |
| 3,496,077 | 2/1970 | Cooper | 204/98 |

*Primary Examiner*—R. L. Andrews
*Attorney, Agent, or Firm*—Peter F. Casella

[57] ABSTRACT

Chlorine dioxide, chlorine, alkali metal hydroxide and hydrogen are produced from hydrogen chloride, alkali metal chlorate, alkali metal chloride and water in a three compartment electrolytic cell in which a buffer compartment between the anode and cathode compartments is separated from the anode compartment by an anion-active permselective membrane and from the cathode compartment by a cation-active permselective membrane. Hydrogen chloride is fed to the anode compartment, aqueous alkali metal chlorate and chloride are fed to the buffer compartment and water is fed to the cathode compartment, with chlorine dioxide and chlorine being taken off from the anode compartment while hydrogen and alkali metal hydroxide substantially free of alkali metal chloride are produced in and removed from the cathode compartment.

The products of the process are obtained in a single vessel in forms suitable for use in pulping wood and bleaching wood pulp without production of undesirable byproducts that create disposal problems or require further processing for conversion to useful products.

10 Claims, 1 Drawing Figure

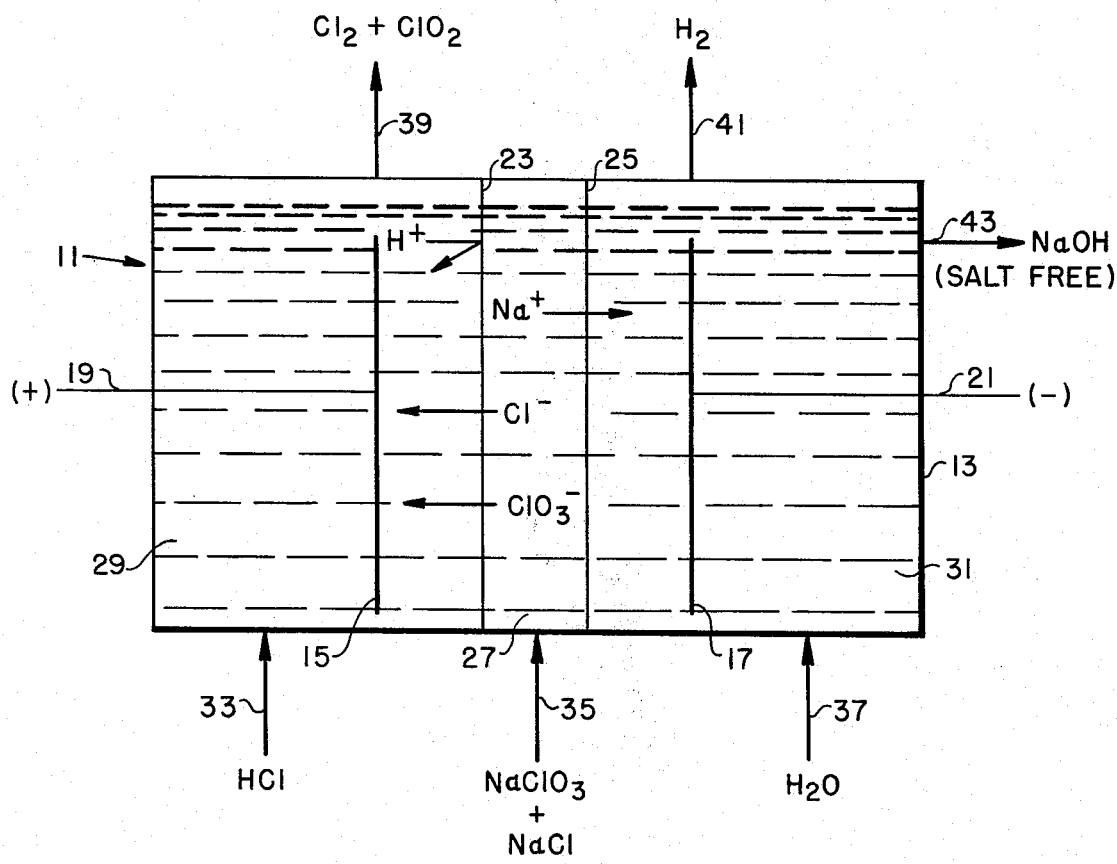

though in three compartments thereof, of chlorine dioxide, chlorine, aqueous alkali metal hydroxide substantially free of salt, and hydrogen, thus avoiding the necessity for otherwise needed separate storage stages, reactors and purification apparatuses. The invention also provides the highly advantageous result of producing aqueous sodium hydroxide substantially free of salt and sufficiently pure as to require little or no further purification for its intended end uses, thus avoiding the expensive purification steps usually employed for this purpose.

ELECTROLYTIC PRODUCTION OF CHLORINE DIOXIDE, CHLORINE, ALKALI METAL HYDROXIDE AND HYDROGEN

This invention relates to an improved method of producing chlorine dioxide, chlorine, aqueous alkali metal hydroxide and hydrogen from hydrogen chloride, alkali metal chlorate, alkali metal chloride and water. More particularly, it is of an improved method for electrolytically producing these products in a single cell.

Increasing requirements for the production of paper have resulted in increased demands for alkali metal hydroxide, e.g., sodium hydroxide, chlorine and chlorine dioxide, which have long been important for producing and bleaching woodpulp. In usual methods for producing chlorine dioxide undesirable byproducts may result, such as excessive amounts of acids or salts, e.g., $Na_2SO_4$, which can create serious pollution problems or may require elaborate or costly apparatuses to convert them to non-polluting forms. Typifying the latter type of disadvantage is the production of chlorine dioxide, chlorine and hydrogen by the prior art Day-Kesting process. In this process aqueous sodium chloride is converted in an electrolytic cell to hydrogen and aqueous sodium chlorate. The chlorate is collected and stored for recirculation to the electrolytic cell and for very slow circulation to a cascade of multiple reactors wherein the chlorate solution is reacted with a countercurrent stream of hydrogen chloride to form a mixture of chlorine and chlorine dioxide, which is scrubbed countercurrently with water to absorb the chlorine dioxide. Chlorine is recovered and the partially exhausted chlorate solution is recycled to the storage stage. This process prescribes the use of an extravagant multiplicity of reactors, e.g., as many as six, for conversion of aqueous alkali metal chlorate to chlorine dioxide and the slow rate of this conversion further requires the provision of an excessively large and costly storage tank for holding the chlorate solution. Accordingly, because of the high capital investment in equipment required, this process has not received practical acceptance in the art [see the article entitled "Recent Developments in the Manufacture of Chlorine Dioxide" by W. H. Rapson, in the Canadian Journal of Chemical Engineering, Vol. 36 (1958) pages 3–7].

Prior art electrolytic methods for manufacturing aqueous alkali metal hydroxide, which usually involve electrolysis of aqueous alkali metal chloride to form the hydroxide solution, hydrogen and chlorine are also troublesome in that the hydroxide product solution is usually heavily contaminated with large quantities of the chloride salt, making it unsuitable or undesirable for many commercial uses. Removal of the alkali metal chloride contaminant generally requires costly and/or tedious purification procedures.

Several disadvantages of the prior art processes are overcome and an effective electrolytic method of manufacturing chlorine dioxide, chlorine, aqueous alkali metal hydroxide substantially free of alkali metal chloride, and hydrogen, in a single vessel is provided by the process of the present invention, which comprises feeding hydrogen chloride to an anode compartment of an electrolytic cell, alkali metal chloride and alkali metal chlorate to a buffer compartment of the cell, water to a cathode compartment of the cell, the anode and buffer compartments of the cell being separated by an anion-active permselective membrane and the buffer and cathode compartments of the cell being separated by a cation-active permselective membrane, so that during electrolysis chlorate and chloride anions diffuse selectively from the buffer compartment to the anode compartment, where they react at or near the anode with the hydrogen chloride to produce chlorine and chlorine dioxide, while alkali metal cations diffuse selectively from the buffer compartment to the cathode compartment, wherein they react with water at the cathode to produce hydrogen and aqueous alkali metal hydroxide substantially free of alkali metal chloride.

The invention also includes a novel three-compartment electrolytic cell for carrying out the present process.

The invention will be readily understood by reference to the following descriptions of embodiments thereof, taken in conjunction with the drawing in which:

The FIGURE is a schematic representation of a three-compartment electrolytic cell for producing chlorine dioxide chlorine, aqueous alkali metal hydroxide and hydrogen. In the FIGURE, the points of addition and withdrawal of typical and preferred reactants and products are illustrated. Although the production of sodium hydroxide, using aqueous sodium chlorate and sodium chloride reactants, is illustrated, other alkali metal cations may also be employed.

In the FIGURE electrolytic cell 11 includes outer wall 13, anode 15, cathode 17 and conductive means 19 and 21 for connecting the anode and cathode to sources of positive and negative electrical potentials, respectively. Inside the walled cell, an anion-active permselective membrane 23 and a cation-active permselective membrane 25 define the anode side wall and cathode side wall, respectively, of a buffer compartment 27, such side walls, with the outer cell walls thereabout defining an anode or anolyte compartment 29, around the anode and a cathode or catholyte compartment 31 around the cathode. Hydrogen chloride, preferably in concentrated or other suitable aqueous solution, is fed to the anode compartment through inlet line 33, aqueous sodium chlorate and aqueous sodium chloride are fed to the buffer compartment through a common inlet line 35 and water is fed to the cathode compartment through inlet line 37. During electrolysis a gaseous mixture of chlorine and chlorine dioxide is removed from above the anode compartment through exit line 39, hydrogen is removed from above the cathode compartment through exit line 41 and aqueous sodium hydroxide solution, substantially free of salt, is removed from the cathode compartment through exit line 43.

While the invention preferably contemplates production of sodium hydroxide from sodium chloride and sodium chlorate, other alkali metal hydroxides such as potassium hydroxide, can be prepared from the corresponding alkali metal chlorates and alkali metal chlorides.

The cell membranes are supported on a filamentary network of inert material such as polytetrafluoroethylene, asbestos, perfluorinated ethylene-propylene copolymer, titanium, tantalum, niobium and noble metals but such supports are not specifically illustrated in the drawing.

A principal advantage of the invention resides in its utilization of anion-active and cation-active permselective membranes to permit production in a single vessel, the illustrated electrolytic cell, of the present chemicals, which are suitable for employment in pulping, bleaching and papermaking plants. The positioning of these membranes within the electrolytic cell establishes the above-described selective diffusion or permeation pattern for cations and anions with cell liquor during the electrolysis so that the reactions proceed in accord with the following overall equation:

$$2MClO_3 + 2MCl + 4HCl + 2H_2O \longrightarrow 2ClO_2 + 3Cl_2 + 4MOH + 2H_2$$

wherein M represents sodium or other alkali metal cation.

Another advantageous aspect of the present process derives from the action of the cation-active permselective membrane. The latter membrane permits alkali metal cation to diffuse from the buffer compartment to the cathode compartment during the electrolysis but does not allow chloride anions to diffuse from the buffer compartment into the cathode compartment. Accordingly, the aqueous alkali metal hydroxide solutions obtained in accordance with the invention are substantially free of alkali metal chloride, i.e., the concentration of alkali metal chloride therein is generally less than about 1.0% and usually is less than about 0.1%. The anion-active and cation-active membranes are also substantially impermeable to the diffusion of gaseous constituents. Accordingly, for example, chlorine produced in the anode compartment does not diffuse into the buffer and cathode compartments, thereby avoiding contamination of the product hydroxide.

In initiating the present process prior to the introduction of the process reactants, the cell compartments are filled with water containing sufficient amounts of the appropriate electrolytes to permit passage of electric current through the cell and initiate the desired electrochemical reactions. Normally the liquid level in the cell will be such as to provide free spaces at the tops of anode and cathode compartments amounting to about 1 to 5% of the volumes of these compartments so as to facilitate collection of product gases from these compartments. The level in the buffer compartment will be approximately the same. In normal operation of the cell about 1 to 3 tons per day and preferably about 1.5 to 2.5 tons/day of hydrogen chloride (computed on a dry weight basis) are charged to the anode compartment. The hydrogen chloride may be charged as gaseous hydrogen chloride, advantageously bubbled or sparged into the anolyte liquor. Preferably the hydrogen chloride is charged to the anode compartment as a concentrated aqueous hydrochloric acid and preferably at a concentration of about 9 to 10.4 gram-equivalents of hydrogen chloride per liter, the maximum concentration of reagent grade concentrated hydrochloric acid being about 10.4 gram-equivalents per liter. If convenient or desired the anolyte liquor may be agitated to facilitate the reaction of the hydrogen chloride with the chloride and chlorate anions in the anolyte.

The alkali metal chloride and alkali metal chlorate are usually charged to the buffer or intermediate compartment in a single aqueous feed stream but plural streams can be used. Generally the alkali metal chloride and alkali metal chlorate are charged at about stoichiometrically equivalent rates and suitable concentrations, usually at rates of about 2 to 4 tons per day for the chlorate and about 1 to 2.5 tons/day for the chloride, preferably 2.5 to 3.5 tons/day and 1.2 to 2 tons/day, respectively, and concentrations of chlorate and chloride salts in the feed solution(s) are each in the range of about 1 to 6 Normal, preferably about 2 to 4 Normal. Water is normally charged to the cathode compartment at a sufficient rate to maintain a constant desired liquid level in the compartments of the cell during electrolysis. The stoichiometric amount is usually at a rate of about 0.2 to 1 ton/day, preferably 0.4 to 0.6 ton/day but to provide fluidity in the electrolyte and dissolve the caustic, much more is used, usually from 2 to 30 tons/day, preferably 5 to 20 tons/day. Except for water, stoichiometric proportions of the reactants are normally employed in accordance with the overall equation previously given, with ratios of reactants being ±20%, preferably ±10% and most preferably ±2%. The present electrolytic cell is usually operated at a temperature in the range of about 20° to 105°C., preferably at a moderately elevated temperature in the range of about 65° to 95°C. The usual cell voltage drop is about 2.5 to 4.0 volts, and the current density is from about 0.5 to 4 amperes per square inch of electrode surface, advantageously from 1 to 3 amperes/sq. in.

In normal operation the present electrolytic cell produces about 2 to 4 tons/day of chlorine, and under preferred operating conditions about 2.5 to 3.5 tons/day. Chlorine dioxide is produced at a rate of about 1.5 to 2.5 tons/day, preferably 1.7 to 2.1 tons/day.

Normally the cell produces hydrogen at a rate of about 80 to 160 lbs./day, preferably at about 100 to 140 lbs./day.

The aqueous alkali metal hydroxide solution recovered from the cathode compartment usually contains about 50 to 300 grams/liter of alkali metal hydroxide, preferably about 80 to 100 g./l. The hydroxide solution is normally produced at a rate of about 1.8 to 3 tons/day, usually at about 2 to 2.5 tons/day, on an anhydrous product basis.

The current efficiency of the present cell is normally above about 85% and often is greater than about 95%. The caustic efficiency of the cell is normally greater than about 75% and is often above about 85%.

The chlorine and chlorine dioxide recovered as a gaseous mixture from the anode compartment can be readily and economically separated by conventional separating techniques. Advantageously, the gaseous mixture may be contacted with water, desirably in countercurrent flow in a conventional absorption tower, to recover chlorine gas overhead and to recover chlorine dioxide as either an aqueous solution of chlorine dioxide, e.g., a solution containing about 4% by weight chlorine dioxide, or as a hydrate of chlorine dioxide, when sufficient cooling is employed. According to a preferred embodiment of the invention recovered chlorine is reacted, as by "burning," with hydrogen recovered from the cathode compartment, to produce hydrogen chloride, which is fed to the anode compartment of the present cell as a reactant.

The anion-active and cation-active permselective membranes are well-known organic polymeric films, represented by an extensive class of proprietary materials. They normally contain a multiplicity of ionic substituents which are capable of undergoing ion-exchanges with aqueous anions or cations. Anion-active membranes typically contain, as ionic substituents, quaternary ammonium groups, such as tetra(-lower alkyl)-substituted positively charged nitrogen or N-lower alkyl-substituted pyridinium groups, wherein the lower alkyl groups are of 1 to 6 carbon atoms. Anions, when contacted in aqueous solution with such membranes, may diffuse through the membrane via ion exchange at the quaternary ammonium substituents, while the membrane remains impermeable toward cations in the solutions. Cation-active permselective membranes typically may contain, as ionic substituents, sulfonate or phosphonate groups. Cations brought into contact in aqueous solutions with the cation-active membranes, diffuse through them via ion exchange at the sulfonate or phosphonate substituents while the membranes remain impermeable with respect to anions in the solution. Anion-active polymeric membranes can be prepared by conventional polymerizations of one or more ethylenically unsaturated monomers and thereafter subjecting the polymer to a conventional reaction sequence for introducing quaternary ammonium groups. For example, styrene can be polymerized to polystyrene, skived to thin sheets and then subjected sequentially to conventional chloromethylation, amination, and quaternization reactions. Additionally, vinyl chloride can be polymerized to polyvinyl chloride, the chloride substituents of the polymer can be replaced by primary amino groups by conventional amination methods and the resultant amino groups can be converted to quaternary nitrogen or amino groups by a conventional quaternization reaction, e.g., a reaction of the primary amino-substituted polymer with a lower alkyl halide. As an alternative to the above synthetic routes an ethylenically unsaturated monomer containing an amino substituent, e.g., vinyl pyridine, can be polymerized and the amino groups of the resultant polymer can then be subjected to quaternization.

Cation-active polymeric membranes can be prepared by synthetic routes analogous to those described in the case of anion-active polymeric membranes. Thus, ethylenically unsaturated monomers such as ethylene, fluorinated olefins, vinyl chloride, styrene and the like can be homo- or co-polymerized and a thin sheet of the resultant polymer can then be subjected to conventional phosphonation of sulfonation to introduce phosphonate or sulfonate substituents. Other polymers, such as phenol-formaldehyde condensates, can be sulfonated according to known techniques, to introduce sulfonate groups. Alternatively, an ethylenically unsaturated monomer containing a halosulfonyl substituent, e.g., a fluorosulfonated perfluorovinyl ether, can be polymerized and the halosulfonyl groups of the resultant polymer can be hydrolyzed to produce a polymer containing a multiplicity of sulfonate substituents. Such products may also be subjected to post-treatments to selectively form amides or other functional groups on one or both sides thereof.

The structures and preparations of anion- and cation-active permselective membranes are more particularly described in the chapter entitled "Membranes" in the *Encyclopedia of Polymer Science and Technology*, published by J. Wiley and Sons (1968), at Volume 8, pages 620–638, and in the chapter entitled "Synthetic Resin Membranes" in *Diffusion and Membrane Technology*, Rheinhold Publishing Corp., New York (1962), at pages 200–206, the pertinent subject matter of which is incorporated herein by reference.

In addition to the anion-active membranes listed above, typical representative anion-active permselective membranes include the following proprietary polymers containing quaternary ammonium substituents: AMFion 310 series, anion type, designated by the manufacturer, American Machine and Foundry Co., as having a polymeric fluorocarbon base; Ionac MA3148, MA 3236, MA 3475 and MA 3475 XL types, designated by the manufacturer, Ritter-Pfaulder Corporation, Permutit Division, as having a heterogeneous polyvinyl chloride base; and Amberlites, made by Dow Chemical Corp., and usually ammonium or quaternary ammonium functionalized styrene grafted onto a polymeric base, such as FEP, TFE, PVC, PE, Nylon or polypropylene.

Preferably, the anion-active membrane utilized in the invention is a quaternary ammonium substituted fluorocarbon polymer or a quaternary ammonium substituted heterogeneous polyvinyl chloride based polymer.

In addition to the sulfonated and phosphonated cation-active polymeric membranes, carboxylated analogues may also be used. Typical representative cation-active membranes include the following proprietary polymeric membranes containing a multiplicity of sulfonate substituents: Ionac types MC 3142, 3235 and MC 3470, designated by the manufacturer, Ritter-Pfaudler Corporation, Permutit Division, as having a heterogeneous polyvinyl chloride base; Amberlites, made by Dow Chemical Corp., usually sulfonated or carboxylated polymers of types mentioned above; Nafion XR type, hydrolyzed copolymer of a perfluorinated olefin and a fluorosulfonated perfluorovinyl ether, manufactured by E. I. DuPont de Nemours and Company, Inc.; modified Nafion XR resin, made by treating one side of an XR membrane with ammonia to convert —$SO_2F$ groups to —$SO_2NH_2$ groups, which are then hydrolyzed to $SO_2NHNa$ structures; and sulfostyrenated perfluorinated ethylene propylene copolymer membranes, marketed as types 18ST12S and 16ST13S by RAI Research Corporation.

The cation-active-permselective membranes which are of a sulfostyrenated derivative of a perfluorinated ethylene-propylene polymer (FEP) are useful and are considered to be superior to the Amberlites and Ionacs. Most preferred are the hydrolyzed copolymers of a perfluoroolefin and a fluorosulfonated perfluorovinyl ether and modifications thereof, such as the —$SO_2NHNa$ modifications thereof.

To manufacture the sulfostyrenated FEP membranes a standard FEP, such as is manufactured by E. I. DuPont de Nemours and Company, Inc., is styrenated and the styrenated polymer is then sulfonated. A solution of styrene in methylene chloride or benzene at a suitable concentration in the range of about 10 to 20% is prepared and a sheet of FEP polymer having a thickness of about 0.02 to 0.5 mm., preferably 0.05 to 0.15 mm., is dipped into the solution. After removal it is subjected to radiation treatment, using a cobalt[60] radiation source. The rate of application may be in the range of about 8,000 rads/hr. and a total radiation application is about 0.9 megarad. After rinsing with water the phenyl rings of the styrene portion of the polymer are monosulfonated, preferably in the para position, by treatment with chlorosulfonic acid, fuming sulfuric acid or $SO_3$. Preferably, chlorosulfonic acid in chloroform is utilized and the sulfonation is completed in about one-half hour.

Sulfostyrenated perfluoroethylene-propylene polymers of this type typically are from 16 to 18% styrenated and have two-thirds to thirteen-sixteenths of phenyl groups therein monosulfonated.

The hydrolyzed copolymer of a perfluoroolefin and a fluorosulfonated perfluorovinyl ether is preferably prepared by employing tetrafluoroethylene as the perfluoroolefin, although other perfluorinated hydrocarbons of 2 to 5 carbon atoms may also be utilized, of which the monoolefinic hydrocarbons are preferred, especially those of 2 to 4 carbon atoms and most especially those of 2 to 3 carbon atoms, e.g., tetrafluoroethylene, hexafluoropropylene. The sulfonated perfluorovinyl ether which is most preferred is that of the formula $FSO_2CF_2CF_2OCF(CF_3)CF_2\text{—}OCF\text{=}CF_2$. Such a material, named as perfluoro [2-(2-fluorosulfonylethoxy)-propyl vinyl ether], referred to henceforth as PSEPVE, may be modified to equivalent monomers, given by the general formula

$$FSO_2CFR^1CF_2O[CFYCF_2O]_nCF\text{=}CF_2$$

where $R^1$ is a radical selected from the group consisting of fluorine and perfluoroalkyl radicals having from 1 to 10 carbon atoms, Y is a radical selected from the group consisting of fluorine and the trifluoromethyl radical, and $n$ is an integer of 1 to 3 inclusive. However, it is most preferred to employ PSEPVE, as the perfluorovinyl ether.

The method of manufacture of the hydrolyzed copolymer is described in Example XVII of U.S. Pat. No. 3,282,875 and an alternative method is mentioned in Canadian Pat. No. 849,670, which also discloses the use of the finished membrane in fuel cells, characterized therein as electrochemical cells. The disclosures of such patents are hereby incorporated herein by reference. In short, the copolymer may be made by reacting PSEPVE or equivalent monomer with tetrafluoroethylene or equivalent monomer in desired proportions in water at elevated temperature and pressure for over an hour, after which time the mix is cooled. It separates into a lower perfluoroether layer and an upper layer of aqueous medium with dispersed desired polymer. The molecular weight is indeterminate but the equivalent weight is about 900 to 1,600 preferably 1,100 to 1,400, e.g., 1,250, and the percentage of PSEPVE or corresponding compound is about 10 to 30%, preferably 15 to 20% and most preferably about 17%. The unhydrolyzed copolymer may be compression molded at high temperature and pressure to produce sheets or membranes, which may vary in thickness from 0.02 to 0.5 mm. These are then further treated to hydrolyze pendant —$SO_2F$ groups to —$SO_3H$ groups, as by treating with 10% sulfuric acid or by the methods of the patents previously mentioned. The presence of the —$SO_3H$ groups may be verified by titration, as described in the Canadian patent. Additional details of various processing steps are described in Canadian Pat. No. 752,427 and U.S. Pat. No. 3,041,317, also hereby incorporated by reference.

Because it has been found that some expansion accompanies hydrolysis of the copolymer it is particularly desirable to position the copolymer membrane after hydrolysis onto a frame or other support which will hold it in place in the electrolytic cell. Then it may be clamped or cemented in place and will be true, without sags. The membrane is preferably joined to the backing tetrafluoroethylene or other suitable support filaments prior to hydrolysis, when it is still thermoplastic and the film of copolymer covers each filament, penetrating into the spaces between them and even around behind them, thinning the films slightly in the process, where they cover the filaments.

The aminated and hydrolyzed improvements or modifications of the polytetrafluoroethylene PSEPVE copolymers are made, as previously indicated, by treatment with ammonia on one side of the copolymer, before hydrolysis thereof, and then hydrolysis with caustic or other suitable alkali. Acid forms may also be utilized. The final hydrolysis may be conducted after the membrane is mounted on its supporting network or screen. The membranes so made are fluorinated polymers having pendant side chains containing sulfonyl groups which are attached to carbon atoms bearing at least one fluorine atom, with sulfonyl groups on one surface being in —$(SO_2NH)_nM$ form, where M is H, $NH_4$, alkali metal or alkaline earth metal and $n$ is the valence of M, and the sulfonyls of the polymer on the other membrane surface being in —$(SO_3)_pY$ or —$SO_2F$ form, wherein Y is a cation and $p$ is the valence of the cation, with the requirement that when Y is H, M is also H. In use the sulfonamide side faces the cathode.

A complete description of methods for making the above improved membrane is found in French Pat. No. 2,152,194 of E. I. DuPont de Nemours and Company, Inc., corresponding to U.S. patent application Ser. No. 178,782, now U.S. Pat. No. 3,784,399 filed Sept. 8, 1971 in the name of Walther Gustav Grot, which disclosures are hereby incorporated herein by reference.

The hydrolyzed copolymer membranes are more stable at elevated temperatures, e.g., above 65°C. They last for much longer time periods in the medium of the chloride-chlorate electrolyte and the caustic product and do not as quickly become objectionably brittle, even in the presence of the bleaching gases and at high cell temperatures. Considering the savings in time and fabrication costs, the present hydrolyzed copolymer membranes are more economical. The voltage drop through such a membrane is acceptable and does not become inordinately high, as it does with many other cation-active membrane materials, when the caustic concentration in the cathode compartment increases to above about 200 g./l. of caustic. The selectivity of the membrane and its compatibility with the electrolyte do not decrease detrimentally as the hydroxyl concentration in the catholyte liquor increases, as has been noted with other membrane materials. Furthermore, the caustic efficiency of the electrolysis does not diminish as significantly as it does with other membranes when the hydroxyl ion concentration in the catholyte increases. These differences are significant in making the present process more advantageous than those of the prior art. While the more preferred hydrolyzed copolymers are those having equivalent weights of 900 to 1,600, with 1,100 to 1,400 being most preferred, some useful resinous membranes employable in the present method may be of equivalent weights from 500 to 4,000. The medium equivalent weight polymers are preferred because they are of satisfactory strength and stability, enable better selective ion exchange to take place and are of lower internal resistances, all of which are important to the present electro-chemical process.

The improved versions of the tetrafluoroethylene-PSEPVE copolymers made by chemical treatment of surfaces thereof to modify the —$SO_3H$ groups thereon may have the modification only on the surface or extending as much as half way through the membrane. The depth of treatment will usually be from 0.001 to 0.2 mm. Caustic efficiencies of the invented processes, using such modified versions of the present improved membranes, can increase about 3 to 20%, often about 10 to 20% over the unmodified membranes.

The membrane walls of both the anion-active and cation-active membranes of the cell will normally be from 0.02 to 0.5 mm. thick, preferably from 0.1 to 0.3 or 0.4 mm. When mounted on a polytetrafluoroethylene, asbestos, titanium or other suitable network, for support, the network filaments or fibers will usually have a thickness of 0.01 to 0.5 mm., preferably 0.05 to 0.15 mm., corresponding to up to the thickness of the membrane. Often it will be preferable for the fibers to be less than half the film thickness but filament thicknesses greater than that of the film may also be successfully employed, e.g., 1.1 to 5 times the film thickness. The networks, screens or cloths have an area percentage of openings therein from about 8 to 80%, preferably 10 to 70% and most preferably 20 to 70%. Generally the cross-sections of the filaments will be circular but other shapes, such as ellipses, squares and rectangles, are also useful. The supporting network is preferably a screen or cloth and although it may be cemented to the membrane the hydrolyzed copolymer membrane is preferably fused to the supporting network by high temperature, high pressure compression prior to hydrolysis of the copolymer. The cemented or fused membrane-network composites are readily clamped or otherwise fastened within the cell in conventional holders or supports.

The material of construction of the cell body may be conventional, including steel, concrete or stressed concrete or other suitably strong material lined with mastics, rubbers, e.g., neoprene, polyvinylidene chloride, FEP, chlorendic acid based polyester, polypropylene, polyvinyl chloride, polytetrafluoroethylene or other suitable inert plastic, usually being in tank or box form. Substantially self-supporting structures, such as rigid polyvinyl chloride, polyvinylidene chloride, polypropylene or phenol formaldehyde resins may be employed, preferably reinforced with molded-in fibers, cloths or webs such as asbestos fibers.

For satisfactory and efficient operations the cell is constructed so that the volume of the buffer compartment or compartments (plural compartments are useful providing that the described membranes are used at the anode and cathode compartment boundaries) will normally be from 1 to 100% that of the sum of the volumes of the anode and cathode compartments, preferably from 5 to 70%, and the anode and cathode compartment volumes will usually be of approximately the same volumes.

While the compartments of the present cell will usually be separated from each other by flat membranes and will usually be of substantially rectilinear or parallelepipedal construction, various other shapes, including curves, e.g., cylinders, spheres, ellipsoids; and irregular surfaces, e.g., sawtoothed or plurally pointed walls, may also be utilized. In accord with conventional electrochemical practice, pluralities of individual cells of the invention can be employed in multi-cell units, often having common feed and product manifolds and being housed in unitary structures.

The electrodes of the cell and the conductive means attached are made of any electrically conductive material which will resist the attack of the various cell contents. In general, the cathodes are made of graphite, iron, lead dioxide on graphite or titanium, steel or noble metal, such as platinum, iridium, ruthenium or rhodium. Of course, when using the noble metals, they may be deposited as surfaces on conductive substrates, e.g., copper, silver, aluminum, steel, iron.

The anodes are also of materials or have surfaces of materials such as graphite, noble metals, noble metal alloys, noble metal oxides, noble metal oxides mixed with valve metal oxides, e.g., ruthenium oxide plus titanium dioxide, or mixtures thereof, on a substrate which is conductive. Preferably, such surfaces are on or with a valve metal and connect to a conductive metal, such as those previously described. Especially useful are platinum, platinum on titanium, platinum oxide on titanium, mixtures of ruthenium and platinum and their oxides on titanium and similar surfaces on other valve metals, e.g., tantalum. The conductors for such materials may be aluminum, copper, silver, steel or iron, with copper being much preferred.

The preferred common material for the surfaces of the cathode and anode is graphite, especially high density graphite, i.e., graphite of a density of about 1.68 to 1.78 g./ml. However, dimensionally stable anodes, e.g., platinum-ruthenium oxide or titanium, are also superior.

The present electrochemical process provides chlorine dioxide, chlorine, alkali metal hydroxide solution and hydrogen efficiently and without costly equipment and uses only a single reaction vessel. The products are in a form ready for immediate use or else require only minimal separating treatment. The chlorine dioxide and chlorine are particularly suitable for use in the woodpulp industry for bleaching and the aqueous caustic solutions are substantially free of alkali metal chloride and accordingly, are particularly suitable for such applications wherein salt-free aqueous caustic is desirable or is required, for example, in woodpulping processes, neutralization of acids, peroxide bleaching, production of pure sulfites and regenerating ion-exchange resins. Furthermore, the process does not produce by-products which pollute the environment or for which disposal is a difficult problem.

In the following examples, which serve to illustrate the invention, parts, percentages and proportions are by weight, unless otherwise noted and temperatures are in °C.

EXAMPLE 1

A three-compartment electrolytic cell, as illustrated in the FIGURE, is utilized to produce chlorine dioxide, chlorine, hydrogen and salt-free aqueous sodium hydroxide from aqueous hydrochloric acid, sodium chlorate, sodium chloride and water. The cell walls are of asbestos-filled polypropylene. The anion-active membrane is a fluorocarbon polymer base substituted with a multiplicity of quaternary ammonium groups, which has a thickness of 6 mils (0.15 mm.) and which is marketed as AMFion 310 series, anion-type membrane, by American Machine and Foundry Co. The cation-active membrane is a Nafion XR type membrane, made by E. I. DuPont de Nemours and Company, Inc. which is of a thickness of 7 mils (0.18 mm.) and which is of a hydrolyzed copolymer of tetrafluoroethylene and a fluorosulfonated perfluorovinyl ether of the formula

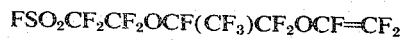

having an equivalent weight of about 1,250. Both membranes are joined, the anion-active by cementing and the cation-active by fusing before hydrolysis, to a supporting network of polytetrafluoroethylene (Teflon) filaments of a diameter of about 0.1 mm., woven into a cloth which has an area percentage of openings therein of about 22%.

In the electrolytic cell the membranes are positioned within 1 mm. from their associated electrode. The membranes are positioned so that the anode compartment, the buffer compartment and the cathode compartment contain about 40, 20 and 40%, respectively, of the total cell volume, which is approximately 8.4 liters. The cell electrodes are rectangular and measure 10 × 100 cm. They are of high density graphite (1.68 to 1.78 g./ml.) manufactured by Union Carbide Corporation.

The anode and buffer compartments are filled with aqueous sodium chloride at a concentration of about 1% and the cathode compartment is filled with 1% sodium hydroxide to provide electrical conductivity in the cell. The cell temperature is adjusted to 90°C. and the current is turned on. Aqueous 10 N hydrochloric acid is fed to the anode compartment at a rate of ½ to $n$/day, 3 N aqueous sodium chlorate and 3 N aqueous sodium chloride are charged to the buffer compartment in a solution fed at a rate of 0.4 ton/day. Water is charged to the cathode compartment to maintain a substantially constant liquid level in the cell, the feed rate thereof being about ½ to $n$/day. The cell, which is rated at 2.9 kiloamperes, is operated at a current density of 2 amperes per square inch and the potential drop across the electrodes is about 3 volts. In one week of continuous operation under the foregoing conditions the cell produces on the average about 190 lbs./day of chlorine dioxide, about 300 lbs./day of chlorine at an average current efficiency of about 98%, and about 400 lbs./day of 2 N aqueous sodium hydroxide, containing about 0.1% of sodium chloride, at an average caustic efficiency of about 90%. The cation-active cell membranes give no indications of degradation or loss of selectivity and efficiency, even after continuous operation for an additional year under the foregoing conditions. However, the anion-active membrane requires earlier replacement, although not so frequently as to be uneconomic.

EXAMPLE 2

The procedure of Example 1 is followed and essentially the same results are obtained, utilizing as cation-active membranes, RAI Research Corporation membranes of 10 mil thickness, identified as 18ST12S and 16ST13S, respectively, instead of the hydrolyzed copolymer of tetrafluoroethylene and sulfonated perfluorovinyl ether. The former of the RAI products is a sulfostyrenated FEP in which the FEP is 18% styrenated and has two-thirds of the phenyl groups thereof monosulfonated, and the latter is 16% styrenated and has thirteen-sixteenths of the phenyl groups monosulfonated. Such membranes stand up well under the described operating conditions and after several month's operation are significantly better in appearance and operating characteristics, e.g., physical appearance, uniformity, voltage drop, than other non-preferred cation-active permselective membrane materials (except the Nafion XR-type hydrolyzed copolymers and the modifications thereof).

EXAMPLE 3

The procedure of Example 1 is repeated substantially as described except that the quaternary ammonium-substituted fluorocarbon polymer anion-active membrane is replaced with a quaternary ammonium-substituted polymer derived from a heterogeneous polyvinylchloride base (Ionac MA 3475XR manufactured by Permutit Division of the Ritter Pfaudler Corporation). The results of continuous operation of this cell for about 1 week are substantially equivalent and similar to those obtained with the cell of Example 1.

The invention has been described with respect to working examples and illustrative embodiments but it is not to be limited to these because it is evident that one of ordinary skill in the art will be able to utilize substitutes and equivalents without departing from the spirit of the invention or going beyond the scope of the claims.

What is claimed is:

1. A method for electrolytically producing chlorine, chlorine dioxide, aqueous alkali metal hydroxide solution substantially free of alkali metal chloride, and hydrogen, which comprises feeding hydrogen chloride to an anode compartment of an electrolytic cell, alkali metal chloride and alkali metal chlorate to a buffer compartment of said cell and water to a cathode compartment, the anode and buffer compartments being separated by an anion-active permselective membrane and the buffer and cathode compartments being separated by a cation-active permselective membrane, so that during electrolysis chlorate and chloride anions pass selectively from the buffer compartment to the anode compartment, where they react at the anode with hydrogen chloride to produce chlorine and chlorine dioxide, and alkali metal cations diffuse selectively from the buffer compartment to the cathode compartment, wherein they react with water at the cathode to produce hydrogen and aqueous alkali metal hydroxide solution substantially free of alkali metal chloride.

2. A method according to claim 1 wherein the alkali metal chloride, alkali metal chlorate and cations are sodium chloride, sodium chlorate and sodium cations, respectively, the chlorate and chloride salts are charged at about stoichiometrically equivalent rates, the anion-active membrane is a quaternary ammonium substituted fluorocarbon polymer or a quaternary ammonium substituted heterogeneous polyvinyl chloride base polymer and the cation-active membrane is selected from the group consisting of sulfostyrenated perfluorinated ethylene propylene copolymers, hydrolyzed copolymers of perfluorinated olefins and fluorosulfonated perfluorovinyl ethers and fluorinated polymers having pendant side chains containing sulfonyl groups which are attached to carbon atoms bearing at least one fluorine atom, with sulfonyl groups on one surface being in $-(SO_2NH)_nM$ form where M is H, $NH_4$, alkali metal or alkaline earth metal and $n$ is the valence of M, and the sulfonyls of the polymer on the other membrane surface being in $-(SO_3)_pY$ form wherein Y is a cation and $p$ is the valence of the cation and when Y is H, M is also H, or being $-SO_2F$.

3. A method according to claim 2 wherein the feed(s) to the buffer compartment solution is/are aqueous and about 1 to 6 Normal in sodium chloride and about 1 to 6 Normal in sodium chlorate, the temperature of electrolysis is below about 105°C., the concentration of aqueous sodium hydroxide produced at the cathode is about 60 to 300 g./l., the current efficiency is greater than about 85%, the caustic efficiency is greater than about 75% and the cation-active membrane is a hydrolyzed copolymer of tetrafluoroethylene and a fluorosulfonated perfluorovinyl ether of the formula

which copolymer has an equivalent weight of about 900 to 1,600 or a perfluorinated copolymer of tetrafluoroethylene and $FSO_2CF_2CF_2OCF(CF_3)CF_2OCF=CF_2$ in a molar ratio of about 7:1, wherein M and Y are both sodium and $n$ and $p$ are both 1.

4. A method according to claim 3 wherein the voltage of the cell is from about 2.5 to 4.0 volts, the current density is from about 0.5 to 4 amperes per square inch of electrode surface, the surfaces of the cathode are of a material selected from the group consisting of platinum, iridium, ruthenium, rhodium, graphite, iron and steel and the surfaces of the anode are of a material selected from the group consisting of noble metals, noble metal alloys, noble metal oxides, mixtures of noble metal oxides, valve metal oxides, mixtures of valve metal oxides and a valve metal, and graphite.

5. A method according to claim 4 wherein the permselective membranes are from about 0.02 to 0.5 mm. in thickness and are supported on a network of material selected from the group consisting of polytetrafluoroethylene, asbestos, perfluorinated ethylene-propylene copolymer, titanium, tantalum, niobium and noble metals, having an area percentage of openings therein of from about 8 to 80%, and the surfaces of the anode and cathode are of graphite.

6. A method according to claim 5 wherein the feed to the buffer compartment is an aqueous solution that contains about 2 to 4 gram-equivalents per liter of sodium chlorate and about 2 to 4 gram-equivalents per liter of sodium chloride, hydrogen chloride is fed to the anode compartment as an aqueous solution, the concentration of aqueous sodium hydroxide produced at the cathode is about 80 to 100 g./l., the current efficiency is greater than about 95%, the caustic efficiency is greater than about 85%, and the electrolysis is carried out at a temperature of about 65° to 95°C.

7. A method according to claim 6 wherein the surfaces of the anode and cathode are graphite of a density of about 1.68 to 1.78 g./ml., the hydrogen chloride feed solution contains about 9 to 10.4 gram-equivalents of hydrogen chloride per liter, the cation-active permselective membrane is the unmodified copolymer and has an equivalent weight of from about 1,100 to 1,400, the cation-active membrane and the anion-active membrane are about 0.1 to 0.3 mm. thick and the membranes are supported on cloths of polytetrafluoroethylene filaments having thicknesses of 0.01 to 0.3 mm. and having an area percentage of openings therein of about 10 to 70%.

8. A method according to claim 7 wherein the anion-active permselective membrane is a quaternary ammonium substituted fluorocarbon polymer.

9. A method according to claim 7 wherein the anion-active membrane is a quaternary ammonium substituted heterogeneous polyvinyl chloride based polymer.

10. A method according to claim 5 wherein the chlorine and chlorine dioxide produced at the anode are separated and separated chlorine is reacted with hydrogen produced at the cathode to produce hydrogen chloride which is charged to the anode compartment as an aqueous solution.

* * * * *